United States Patent [19]

Moon-Kau

[11] Patent Number: 4,706,896
[45] Date of Patent: Nov. 17, 1987

[54] FOOD PROCESSOR

[75] Inventor: David T. Moon-Kau, Kowloon, Hong Kong

[73] Assignee: Chiaphua Industries Limited, Hong Kong

[21] Appl. No.: 872,959

[22] Filed: Jun. 11, 1986

[51] Int. Cl.⁴ .............................................. B02C 25/00
[52] U.S. Cl. ................................. 241/37.5; 241/282.1
[58] Field of Search ................ 366/601; 241/36, 37.5, 241/282.1, 282.2

[56] References Cited

U.S. PATENT DOCUMENTS 4,614,306  9/1986  Doggett .............................. 241/37.5

Primary Examiner—Mark Rosenbaum
Attorney, Agent, or Firm—Remy J. VanOphem

[57] ABSTRACT

A food processor has a base unit, a removable bowl attached to the base unit and a removable lid on the bowl. The base unit houses an electric motor for driving processing tools in the bowl. The lid and bowl have interengaging formations which attach the lid to the bowl when the lid is on the bowl in a fixed angular relationship thereto. A switch mechanism for energizing the motor comprises two electrical switches in the base unit, a switch actuator slidable in an actuator housing on the bowl against the urging force of a spring and a switch button slidable in a switch button housing on the lid of the bowl also against the urging force of another spring. When the lid is attached to the bowl the switch can be operated by manually depressing the switch button which in turn depresses the switch actuator. The switch button can be held down manually to operate the processor in a short burst. The switch button also has a selectively operable locking member for releasably locking the switch button in its depressed position for longer operation of the processor. When depressed the switch button prevents removal of the lid from the bowl and moreover engages with the actuator in a manner such that should the actuator become jammed in a depressed position the switch button will likewise remain in a depressed position.

11 Claims, 6 Drawing Figures

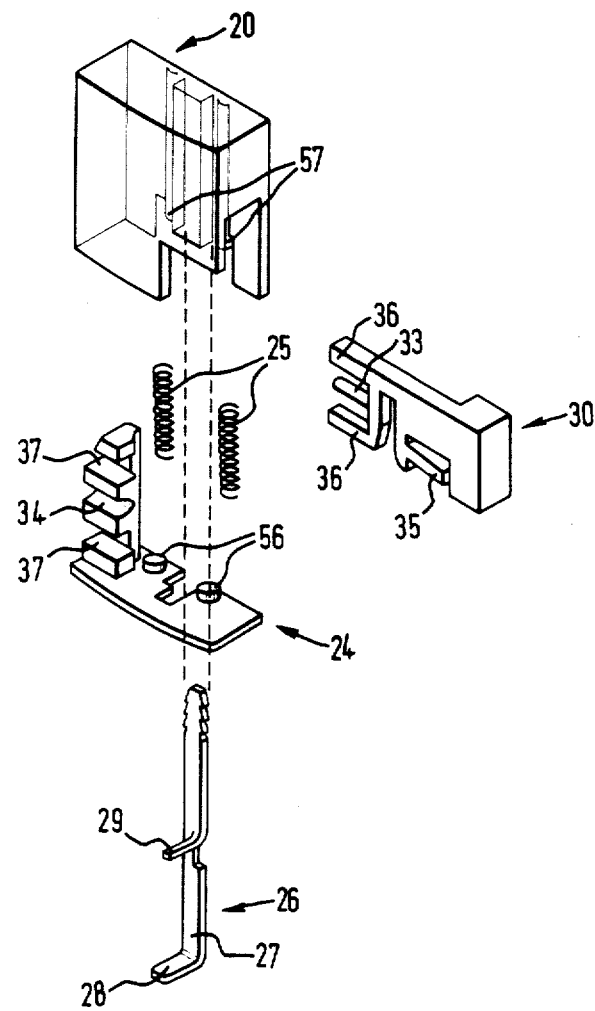
FIG. 2.
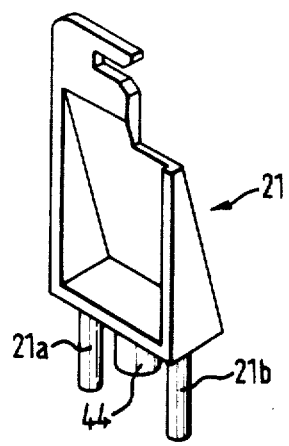

FOOD PROCESSOR

FIELD OF THE INVENTION

This invention relates to food processors and more particularly to switch mechanisms thereof.

BACKGROUD AND ART

Food processors generally comprise a base unit which houses an electric motor in particular a universal motor, one or more removable bowls which can be attached to the upper end of the base unit, a removable lid or cover on the bowl and a variety of processing tools which can be used for inter alia chopping, shredding, slicing, mixing, mincing and whipping. The processing tools are selectively mounted on a drive spindle which is driven by the motor and which projects into the bowl through a base thereof. Some known food processors are provided only with a switch of the type which needs to be constantly depressed by a user in order to energise the motor. Some known food processors additionally have a separate on/off or toggle switch which has two stable positions so that the motor can be energised for a comparatively long period without the user having to constantly depress the switch. Where two such switches are provided in known food processors they are mounted on the base unit and without an interlock mechanism to present removal of the lid whilst the motor is energised there would be the risk of injury to a user. Such interlock mechanisms are relatively expensive. Moreover, a user finds it more convenient to operate the processor from a position on the bowl lid. It is known to provide a switch button on the lid of the bowl. This button can be depressed to energise the motor and when depressed is arranged to prevent removal of the lid. However, the switch button only operates by constant pressure applied by a user. Whilst this is acceptable for operation of the food processor in very short bursts it is far from acceptable when the food processor has to be operated for a comparatively long period.

DISCLOSURE OF THE INVENTION

It is an object of the invention to provide a food processor with an improved switch mechanism.

In one aspect the invention provides in a food processor comprising a base unit, an electric motor housed in the base unit, a bowl removably attached to an upper end of the base unit and provided with a removable lid, the bowl and lid having mutually engageable parts which attach the lid to the bowl when the lid is in a fixed angular relationship to the bowl, and a drive means drivably connected to the motor and projecting into the bowl through a base thereof, for receiving and driving a processing tool in the bowl; a switch mechanism comprising:

electric switch means provided in the base unit for energising and de-energising the motor;
a switch actuator housing provided on the bowl;
a switch actuator slidably mounted in the switch actuator housing for movement between a first position in which the switch means in use de-energises the motor and a second position in which the switch means in use energises the motor;
spring means urging the switch actuator to its first position;
a switch button housing provided on the lid of the bowl;
a switch button slidably mounted in the switch button housing for movement between a first and a second position;
spring means urging the switch button to its first position, the switch button being movable manually against the urging force of the spring to its second position to prevent removal of the lid and to move the switch actuator to its second position when the lid is attached to the bowl; and
a selectively operable locking member for releasably holding the switch button in its second position.

Thus, the switch button will prevent removal of the bowl lid when the motor is energised and has the additional advantage that it can be selectively locked in a depressed position so that it is not necessary to maintain manual pressure thereon.

In another aspect the invention provides in a food processor comprising a base unit, an electric motor housed in the base unit, a bowl removably attached to an upper end of the base unit and provided with a removable lid, the bowl and lid having mutually engageable parts which attach the lid to the bowl when the lid is in a fixed angular relationship to the bowl, and a drive means drivably connected to the motor and projecting into the bowl through a base thereof, for receiving and driving a processing tool in the bowl; a switch mechanism comprising:

electric switch means provided in the base unit for energising and de-energising the motor;
a switch actuator housing provided on the bowl;
a switch actuator slidably mounted in the switch actuator housing for movement between a first position in which the switch means in use de-energises the motor and a second position in which the switch means in use energises the motor;
spring means urging the switch actuator to its first position;
a switch button housing provided on the lid of the bowl;
a switch button slidably mounted in a switch button housing for movement between a first and a second position; and
spring means urging the switch button to its first position, the switch button being movable manually against the urging force of the spring to its second position to prevent removal of the lid and to move the switch actuator to its second position when the lid is attached to the bowl; the switch button having an operating part which engages with the swtich actuator when the lid is attached to the bowl in a manner to prevent the switch button from moving from its second to its first position with the switch actuator remaining in its second position.

Thus, if the actuator becomes jammed in a depressed position with the motor thereby energised, the switch button will also remain depressed to prevent removal of the bowl lid and hence the risk of injury to a user.

An embodiment of the invention is hereinafter described, by way of example, with reference to the accompanying drawings.

BRIEF DESCRIPTION OF THE DRAWINGS

FIG. 2 is an exploded view of the switch button and actuator of the food processor of FIG. 1.

MODE FOR CARRYING OUT THE INVENTION

Figure 1:
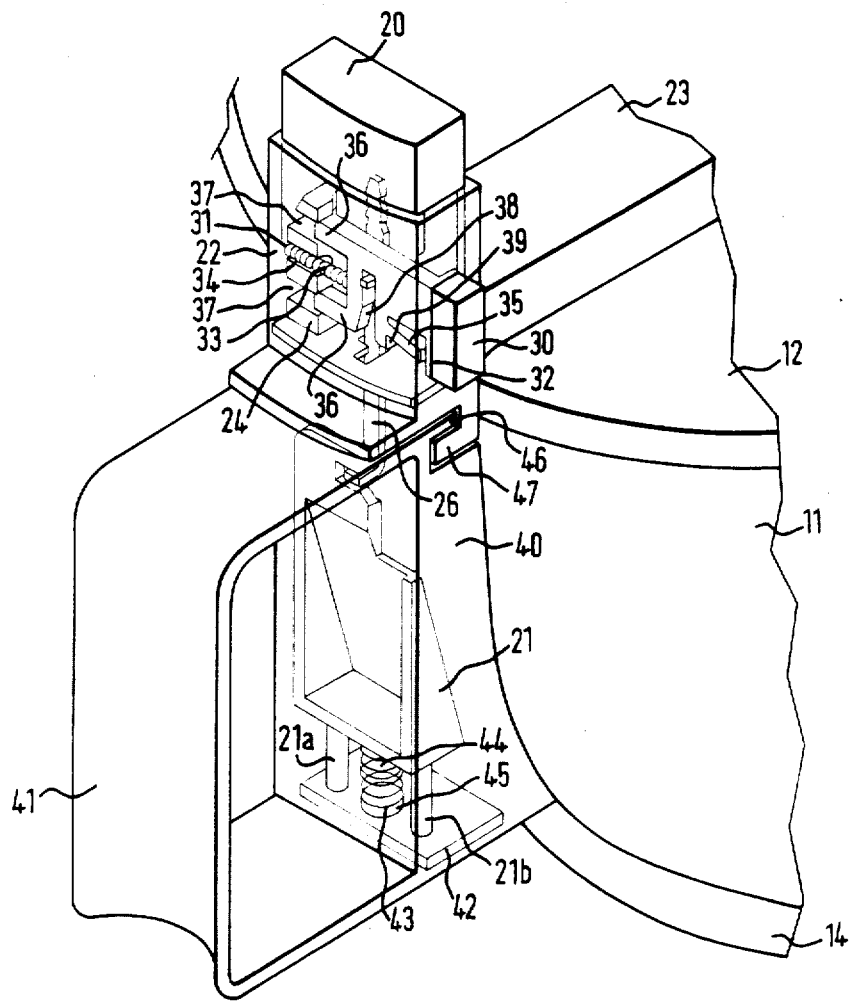
FIG. 1 is an isometric view of part of one embodiment of a food processor according to the invention, with the base unit omitted.
Figure 3:
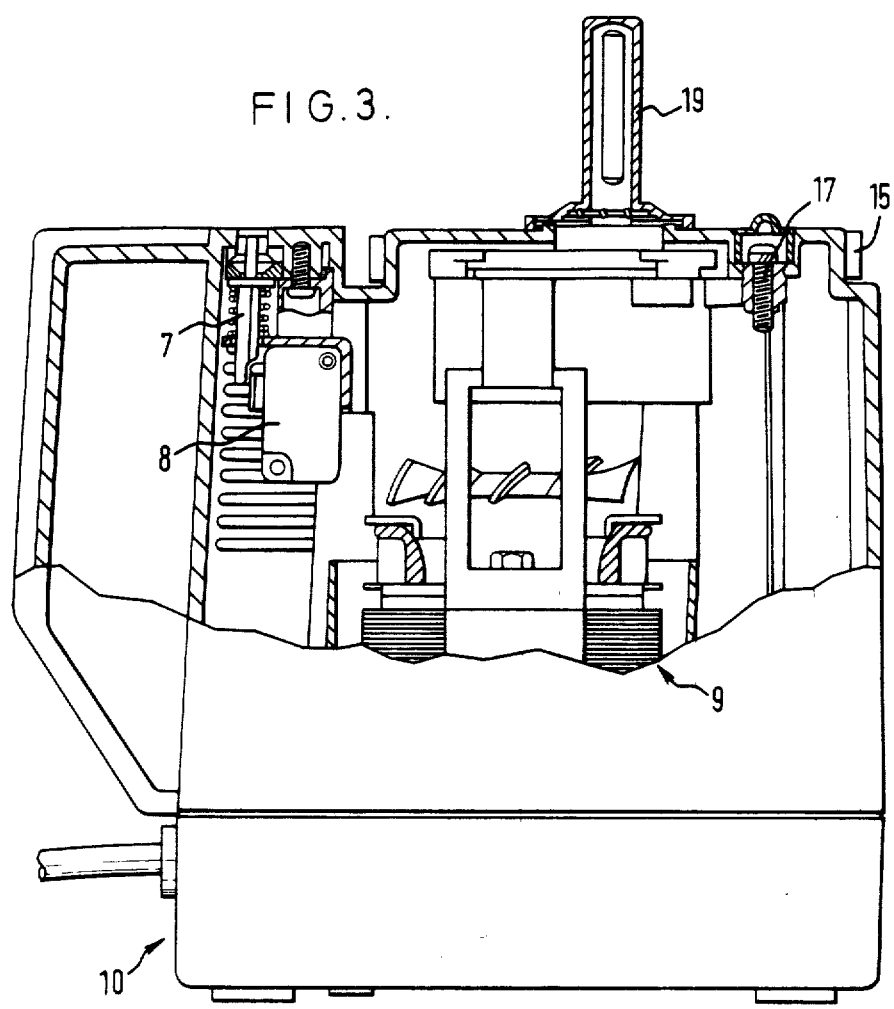
FIG. 3 is a side view of another part of the embodiment of the food processor of FIG. 1, shown partly in section.
Figure 4:
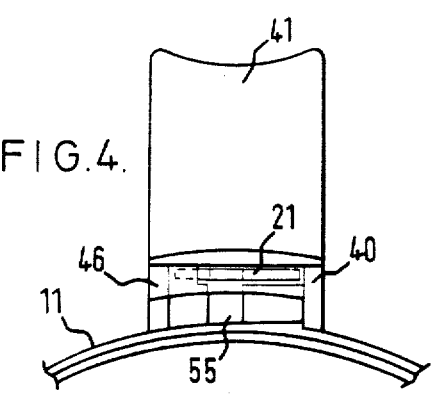
FIG. 4 is a scrap plan view of the actuator housing of the part shown in FIG. 1.
Figure 5:
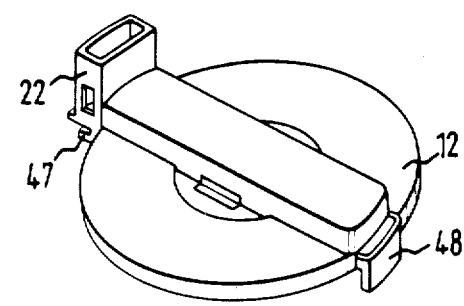
FIG. 5 is a perspective view of the bowl and lid of the food processor of FIG. 1.
Figure 5:
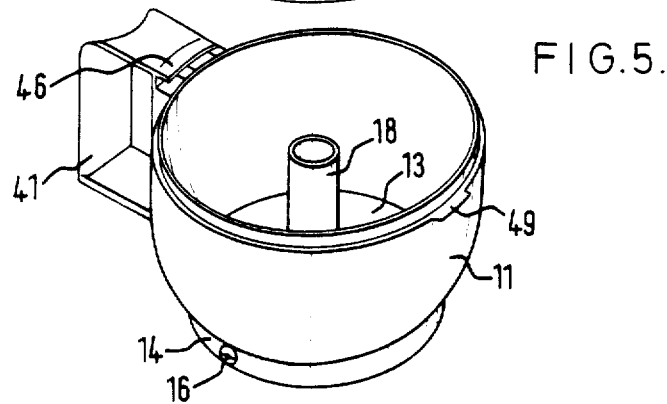

Referring to FIGS. 1 through 5 of the drawings, the food processor shown therein comprises a base unit 10 housing a mains operated universal electric motor 9 made by Eastern Time Limited and sold under the serial no.UF30-LOIA and a bowl 11 provided with a removable lid 12. The bowl 11 has a base 13 from which depends a cylindrical skirt 14. The skirt 14 fits snugly over an upstanding tubular boss 15 at the upper end of the base unit 10 and has two diametrically opposed formations 16 which snap-fittably engage in conventional manner with projections extending radially outwards from the boss 15 by displacing the bowl 11 relative to the base unit 10 in one angular direction. To remove the bowl 11 it is necessary to displace it angularly in the opposite direction before lifting it off the base unit 10.

The motor 9 is attached to the underside of the upper surface of the base unit 10 by screws (one of which is shown at 17).

The bowl 11 has an internal upstanding integral sleeve 18 aligned with a central aperture in the base 13. A drive spindle 19, which is driven by the motor within the base unit 10, projects into the sleeve 18 for selectively receiving in readily removable manner processing tools, such as a slicing/shredding disc and a steel cutting blade. The base unit 10 also houses electric switch means in the form of two micro-switches made by Matsushita Electric Works Ltd. and sold under the serial No. AH715054, one of which is shown and designated reference numeral 8. These micro-switches are mounted in the base unit 10 close to the upper surface thereof and are operated by a switch button 20, a switch actuator 21, and associated spring loaded plungers 7 in a manner to be more particularly described.

The switch button 20 is vertically slidably mounted in a switch button housing 22. The housing 22 is integrally moulded with the bowl lid 12 and is radially aligned with a diametrically extending handle 23 of the lid 12. A guide part 24 is located in the lower end of the housing 22 and two compression springs 25 located at opposite ends, respectively, on studs 56 upstanding from the guide part 24 and studs 57 depending from the switch button 20 urge the switch button 20 to a first uppermost position in which the button 20 projects to a considerable extent from the upper end of the housing 22. The switch button 20 includes an L-shaped metal operating part 26 having an elongate vertical limb 27 and a shorter horizontal limb 28 extending away from the central axis of the bowl lid 12. The operating part 26 also has an integral lug 29 which is cut-away and bent out of the plane of the limb 27 for a purpose which will become apparent hereinafter.

The switch button 20 has an associated selectively operable locking member 30. The locking member 30 is mounted in the switch button housing 22 for slidable movement in a horizontal direction. The locking member 30 is urged by a compression spring 31 to a first position in which it projects from an aperture 32 in a side wall of the housing 22. The compression spring 31 is located at one end on a stud 33 of the locking member and at the other end in a central groove 34 in the guide part 24 and the locking member 30 is held captive with respect to the housing 22 by an integral resilient finger portion 35 which assumes a position in which the free end thereof is engageable with the inner surface of the aforesaid side wall of the housing 22 adjacent to the aperture 32 therein. The locking member 30 is bifurcated at its innermost end and has two spaced parallel prongs 36 which slide in grooves 37 in the guide part 24 to guide the locking member 30 in movement against the urging force of the compression spring 31 from its aforesaid first position to a second position. The locking member 30 also has a vertical slot 38 which is open and flared at its lower end and a retaining lip 39 between the lower end of the slot 38 and the finger portion 35.

Normally, the switch button 20 and the locking member 30 are urged to their respective first positions. In these positions the lug 29 of the operating part 26 contacts the inner end of the slot 38 in the locking member 30 and this contact holds the button 20 captive with respect to the housing 22. However, the button 20 can be manually depressed to lower the operating part 26 to operate the micro-switches 8 in the base unit 10 by way of the actuator 21 and associated spring loaded plungers 7. The button 20 can be held in its depressed position manually if the food processor is to be operated in a short burst but if prolonged operation of the food processor is required the button 20 can be locked in its depressed position by the locking member 30. As the button 20 is depressed the lug 29 is moved out of the slot 38. The locking member 30 can then be moved against the urging force of the spring 31 to a position in which the retaining lip 39 passes over the lug 29. With the locking member 30 held in this position the button 20 can be released and the springs 25 will urge the button 20 slightly upwards to bring the lug 29 into contact with lower edge of the finger portion 35 of the locking member and behind the retaining lip 39. In this condition the locking member 30 will be held in its depressed position by contact between the lip 39 and the lug 29 and the locking member 30 will in turn hold the button 20 in its depressed position. To release the locking member 30 the button 20 is depressed slightly to free the lug 29 from behind the lip 39. The locking member 30 will then return under the urging force of its spring 31 to its first position aligning the slot 38 with the lug 29 so that the button 20 will return to its first position when it is released.

The switch actuator 21 is vertically slidably mounted in a switch actuator housing 40 provided on the side of the bowl 11 and within the confines of a C-shaped bowl handle 41. The housing 40 has a removable base 42 for the purpose of assembling the actuator 21 therein. The actuator 21 is generally wedge-shaped when viewed from either side of the handle 41 and is urged upwardly by a compression spring 43 located at one end on a depending stud 44 of the actuator and at the other end on a stud 45 upstanding from the base 42 of the housing 40.

The upper end of the actuator 21 is hook-shaped and projects through a generally T-shaped aperture 55 (see FIG. 4) in the upper end of the housing 40, the hook-shaped portion being engageable with an overhanging lip 46 to hold the actuator 21 captive with respect to the housing 40 and shield it from accidental operation. The lower end of the actuator 21 has a pair of depending rod portions 21a and 21b which, when the actuator 21 is moved against the urging force of its spring 43 the rod portions 21a and 21b project through associated holes in the base 42 and into corresponding holes in the upper surface of the base unit 10 to operate the micro-switches in the base unit via plungers 7.

The lid 12 has an L-shaped retaining member 47 directly below the switch button housing 22, the horizontal limb of which can be engaged under the overhanging lip 46 on the bowl 11 when the switch button housing 22 is angularly displaced into alignment with the actuator housing 40. The retaining memer 47 and lip 46 together with complementary formations 48 and 49 provided on the lid 12 and the bowl 11 at positions diametrically opposite to the retaining member 47 and lip 46, respectively, fix the lid 11 to the bowl 12.

Thus to mount the lid 12 on the bowl 11 the lid 12 is placed on the bowl 11 with the retaining member 47 slightly angularly offset from the lip 46 and the formation 48 likewise slightly angularly offset from the formation 49. The lid 12 is then angularly displaced to bring the retaining member 47 into engagement below the lip 46 and the formation 48 into engagement with the formation 49. As the retaining member 47 moves into engagement below the lip 46 the horizontal limb 28 of the operating part 26 enters the hook portion at the upper end of the actuator 21.

To operate the food processor the switch button 20 is depressed as aforesaid. The actuator 21 is moved downwards by the operating part 26 and the rod portions 21a and 21b of the actuator 21 operate the micro-switches 8 via the plungers 7. Whilst the switch button 20 is depressed the operating part 26 extends through the generally T-shaped aperture in the upper end of the actuator housing 40. This prevents angular displacement of the lid 12 relative to the bowl 11 so that the lid cannot be removed. Also the rod portions 21a and 21b project into holes in the base unit 10 to prevent angular movement of the bowl 11 relative to the base unit 10 so that the bowl cannot be removed.

If for any reason, the actuator 21 becomes jammed in its lower position so that the motor remains energised, the switch button 20 will remain in a depressed position due to engagement between the horizontal limb 28 of the operating part 26 and the hook portion of the actuator 21. Consequently, a user will not be able to remove the lid 12 of the bowl 11 if such a jamming occurs.

Also, with the above-described arrangement it is practically impossible to depress the actuator 21 accidentally, such as when cleaning the bowl 11 with the lid 12 removed. This is because the hook portion of the actuator 21 is well sheilded by the overhanging lip 46 and the only other access to the actuator 21 is via the generally T-shaped aperture 55 in the upper end of the actuator housing 40. Even if a solid object such as a fork wrapped in a cloth and serving as a cleaning implement were to pass through the T-shaped aperture 55 it would bear against the steeply sloped face of the wedge-shaped actuator 21 and would not, therefore, depress the actuator 21 to operate the micro-switches 8 in the base unit 10.

Figure 6:
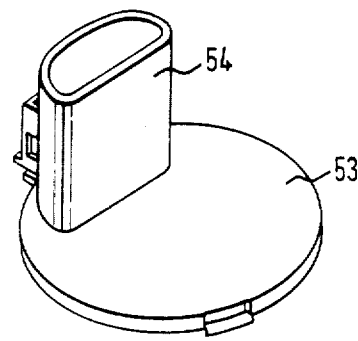
FIG. 6 is a perspective view of an alternative bowl for use with the base unit of the food processor of FIG. 1.
Figure 6:
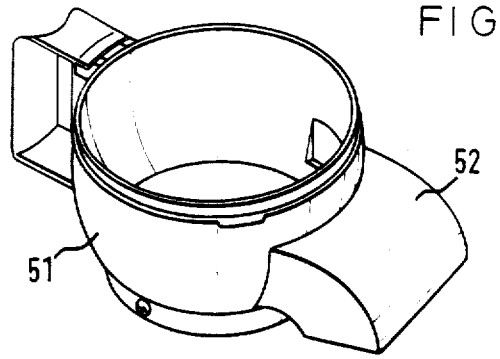

FIG. 6 shows an alternative bowl 51 which could be provided with the food processor and which could be interchanged with the bowl 11. The bowl 51 can be used in particular for continuous slicing or shredding. The bowl 51 has an outlet chute 52 and a lid 53 with a feed tube 54. However, the switch mechanism is identical to that provided on the bowl 11 and lid 12.

The above embodiment is given by way of example only and it will be apparent to persons skilled in the art that various modifications could be made without departing from the scope of the invention defined in the appended claims.

I claim:

1. A food processor, comprising:
a base unit; an electric motor housed in said base unit; a bowl having a bottom removably attached to said base unit; a removable lid, said bowl and lid having mutually engageable parts which attach said lid to said bowl when said lid is in a fixed angular relationship to said bowl; and drive means drivably connected to said electric motor, said drive means projecting into said bowl through said bottom for receiving and driving a processing tool in said bowl;
electric switch means provided in said base unit for energizing and de-energizing said electric motor;
a switch actuator housing provided on said bowl;
a switch actuator slidably mounted in said switch actuator housing for movement between a first position in which said electric switch means in use de-energizes said electric motor and a second position in which said electric switch means in use energizes said electric motor;
spring means urging said switch actuator to its first position;
a switch button housing provided on said lid of said bowl;
a switch button slidably mounted in said switch button housing for movement between a first and a second position;
spring means urging said switch button to its first position, said switch button being movable manually against an urging force of a spring to its second position to prevent removal of said lid and to move said switch actuator to its second position when said lid is attached to said bowl; and
a selectively operable locking member for releasably holding said switch button in its second position.

2. The food processor of claim 1, in which said locking member is slidably mounted in said switch button housing for movement in a direction transverse to movement of said switch button, when said switch button is in its second position, between a first position in which said switch button is free to move between its first and second positions and a second position in which said switch button is releasably held in its second position.

3. The food processor of claim 2, in which spring means urge said locking member to its first position and in which said locking member and said switch button have parts which interengage to hold said locking member in its second position and said switch button in its second position against an urging force of said spring means.

4. The food processor of claim 1, in which said switch button has an operating part which engages with said switch actuator when said lid is attached to said bowl in a manner to prevent said switch button from moving from its second to its first position with said switch actuator remaining in its second position.

5. The food processor of claim 4, in which said operating part is generally L-shaped and comprises a vertically extending portion and a horizontally extending portion which engages beneath a part of said switch actuator as said lid is attached to said bowl.

6. The food processor of claim 5, wherein said actuator includes a hook means which provides said part thereof which engages beneath said horizontally extending portion of said operating part of said switch button.

7. The food processor of claim 1, in which said bowl includes a handle and said switch actuator housing is provided within the confines of said handle.

8. A food processor, comprising:

a base unit; an electric motor housed in said base unit; a bowl having a bottom removably attached to said base unit; a removable lid, said bowl and lid having mutually engageable parts which attach said lid to said bowl when said lid is in a fixed angular relationship to said bowl, drive means drivably connected to said electric motor, said drive means projecting into said bowl through said bottom for receiving and driving a processing tool in said bowl;

electric switch means provided in said base unit for energizing and de-energizing said electric motor;

a switch actuator housing provided on said bowl;

a switch actuator slidably mounted in said switch actuator housing for movement between a first position in which said electric switch means in use de-energizes said electric motor and a second position in which said electric switch means in use energizes said electric motor;

spring means urging said switch actuator to its first position;

a switch button housing provided on said lid of said bowl;

a switch button slidably mounted in said switch button housing for movement between a first and a second position; and spring means urging said switch button to its first position, said switch button being movable manually against an urging force of a spring to its second position to prevent removal of said lid and to move said switch actuator to its second position when said lid is attached to said bowl; said switch button having an operating part which engages with said switch actuator when said lid is attached to said bowl in a manner to prevent said switch button from moving from its second to its first position with said switch actuator remaining in its second position.

9. The food processor of claim 8, in which said operating part is generally L-shaped and comprises a vertically extending portion and a horizontally extending portion which engages beneath a part of said switch actuator as said lid is attached to said bowl.

10. The food processor of claim 9, wherein the actuator includes a hook means which provides said part thereof which engages beneath said horizontally extending portion of said operating part of said switch button.

11. A food processor comprising:

a base unit; an electric motor housed in said base unit; a bowl having a bottom removably attached to said base unit; a removable lid, said bowl and lid having mutually engageable parts which attach said lid to said bowl when said lid is in a fixed angular relationship to said bowl; drive means drivably connected to said electric motor, said drive means projecting into said bowl through said bottom for receiving and driving a processing tool in said bowl;

electric switch means provided in said base unit for energizing and de-energizing said electric motor;

a switch actuator housing provided on said bowl;

a switch actuator slidably mounted in said switch actuator housing for movement between a first position in which said electric switch means in use de-energizes said electric motor and a second position in which said switch means in use energizes said electric motor;

spring means urging said switch actuator to its first position;

a switch button housing provided on said lid of said bowl;

a switch button slidably mounted in said switch button housing for movement between a first and a second position; and spring means urging said switch button to its first position, said switch button being movable manually against an urging force of a spring to its second position to prevent removal of said lid and to move said switch actuator to its second position when said lid is attached to said bowl, said switch button having an operating part which engages with said switch actuator, when said lid is attached to said bowl, at a position beneath an overhanging lip, said overhanging lip shielding said switch actuator from accidental movement from its first to its second position when said lid is not attached to said bowl.

* * * * *

UNITED STATES PATENT AND TRADEMARK OFFICE
CERTIFICATE OF CORRECTION

PATENT NO. : 4,706,896
DATED : November 17, 1987
INVENTOR(S) : David Tam Moon-Kau It is certified that error appears in the above-identified patent and that said Letters Patent is hereby corrected as shown below:

Column 1, line 8, delete "BACKGROUD" and insert ---- BACKGROUND ----.

Column 1, line 28, delete "present" and insert ---- prevent ----.

Column 2, line 48, delete "swtich" and insert ---- switch ----.

Column 5, line 13, delete "memer" and insert ---- member ----.

Column 5, line 54, delete "sheilded" and insert ---- shielded ----.

In the Claims

Column 6, line 15, delete "and".

Signed and Sealed this

Seventh Day of June, 1988

Attest:

DONALD J. QUIGG

Attesting Officer

Commissioner of Patents and Trademarks